United States Patent [19]

Mark et al.

[11] Patent Number: 4,562,242
[45] Date of Patent: Dec. 31, 1985

[54] BRANCHED POLYCARBONATE FROM CARBOXY CONTAINING DIPHENOL

[75] Inventors: Victor Mark, Evansville; Charles V. Hedges, Mt. Vernon, both of Ind.

[73] Assignee: General Electric Company, Mt. Vernon, Ind.

[21] Appl. No.: 685,907

[22] Filed: Dec. 24, 1984

[51] Int. Cl.$^4$ ............................................. C08G 63/62
[52] U.S. Cl. .................................... 528/193; 528/176; 528/191; 528/202; 528/204
[58] Field of Search ............... 528/193, 204, 191, 202, 528/176

[56] References Cited

U.S. PATENT DOCUMENTS 3,445,428  5/1969  Bottenbruch et al. ............... 528/204

Primary Examiner—Harold D. Anderson
Attorney, Agent, or Firm—John Schneller; Martin B. Barancik

[57] ABSTRACT

High molecular weight, thermoplastic, randomly branched polycarbonates of an aromatic dihydric phenol, a carbonate precursor, and a chain branching agent comprising at least one compound selected from the formula:

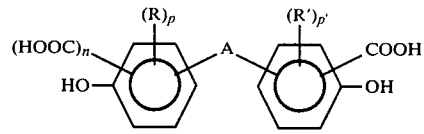

where
A is selected from alkylene radicals from 1 to 6 carbons, alkylidene radicals from 2 to 6 carbons, cycloalkylene radicals and cycloalkylidene radicals containing from 4 to 6 carbon atoms;
R and R' are independently selected from halogen radicals, monovalent hydrocarbon radicals of from 1 to 4 carbon atoms, and monovalent hydrocarbonoxy radicals of from 1 to 4 carbon atoms;
n is an integer having a value of 0 or 1; and
p and p' are integers having a value of 0 or 1.

26 Claims, No Drawings

BRANCHED POLYCARBONATE FROM CARBOXY CONTAINING DIPHENOL

FIELD OF THE INVENTION

The invention relates to thermoplastic, randomly branched polycarbonates produced from polyfunctional phenolic carboxylic acids.

BACKGRUND OF THE INVENTION

Polycarbonates are well known, commercially important materials which have achieved wide acceptance in the plastics industry. Such polymers are prepared by reacting a carbonate precursor such as phosgene, for example, with a dihydric phenol such as 2,2-bis(4-hydroxyphenyl)propane, herein referred to as "bisphenol-A," to provide a linear polymer consisting of dihydric phenol units bonded to one another through carbonate linkages. Generally speaking, such polymers have a high tensile strength, thermal and dimensional stability, clarity and impact strength surpassing that of many other thermoplastic materials.

These aromatic polycarbonates differ from most thermoplastic polymers in their melt rheology behavior, in that they, in contrast to most thermoplastic polymers, exhibit Newtonian flow at normal processing temperatures and shear rates below 300 reciprocal seconds. Newtonian flow is the type of flow occurring in a liquid system when the rate of shear is directly proportional to the shearing force, i.e., there is a constant value of viscosity.

Most other thermoplastic polymers exhibit non-Newtonian flow characteristics over essentially all melt processing conditions. Non-Newtonian flow occurs when the viscosity varies with shear rate.

Two other characteristics of molten thermoplastic polymers are significant for molding: melt elasticity and melt strength. Melt elasticity is the recovery of the elastic energy stored within the melt because of distortion or orientation of the molecules by shearing stresses. Melt strength may be described as the tenacity of a molten strand and also the ability of the melt to support a stress. Both melt elasticity and melt strength are important properties in extrusion molding, particularly in fabrication by extrusion blow molding.

Non-Newtonian flow characteristics tend to impart elasticity and melt strength to such polymers, allowing the use of such polymers in blow molding fabrication. In the usual blow molding operation, a hollow tube of molten thermoplastic is extruded vertically downward at a temperature of about 200° to about 400° C. A mold then surrounds the tube, and gas is introduced into the tube to force it to conform to the shape of the mold. The length of the tube and quantity of material comprising the tube are limiting factors in determining the ultimate size and wall thickness of the molded part.

The fluidity of the melt obtained from bisphenol-A polycarbonate, the relatively low melt strength and also the paucity of extrudate swelling, serve to limit blow molding applications to relatively small, thin-walled parts. Temperatures must also be extremely carefully controlled to prevent the desired length of extruded tube from falling away before the mold can close around it for blowing. Consequently, it will be appreciated that the Newtonian behavior of polycarbonate resin melts has served to severely restrict their use in the production of large hollow bodies by conventional extrusion blow-molding operations as well as in the production of various shapes by profile extrusion methods. Thus, it is desirable to form polycarbonates which provide melts with increased stability during molding at elevated temperatures.

Several prior disclosures, such as U.S. Pat. Nos. 2,950,266 and 3,030,335, describe the addition of a trifunctional additive to polycarbonate forming reactions between dihydric phenols and carbonyl halides. Other prior attempts have been made to incorporate a polyfunctional compound into polycarbonates, for example, U.S. Pat. Nos. 3,094,508 and 3,544,514. These disclosures are limited to the preparation of high molecular weight polymers under very limited processing conditions. Their preparation requires carefully controlled processing conditions, which are both cumbersome and expensive. Additional processes are disclosed in U.S. Pat. No. 4,001,184. Other attempts have been made to provide polycarbonate resins which exhibit non-Newtonian melt characteristics as, for example, disclosed in U.S. Pat. No. 3,166,606. However, the polycarbonates therein disclosed consist of a physical blend of two or more polycarbonate resins produced entirely from difunctional reactants. U.S. Pat. No. 4,277,600 describes tetraphenolic compounds obtained from monofunctional phenols and diene precursors.

SUMMARY OF THE INVENTION

High molecular weight, thermoplastic, randomly branched polycarbonates of the invention are prepared from an aromatic dihydric phenol, a carbonate precursor and a chain branching component comprising at least one compound of the following formula

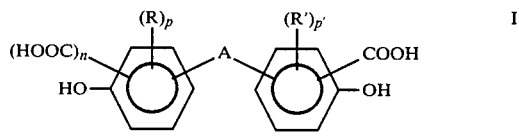

where
- A is selected from alkylene radicals from 1 to 6 carbons, alkylidene radicals from 1 to 6 carbons, cycloalkylene radicals and cycloalkylidene radicals containing from 4 to 6 carbon atoms;
- R and R' are independently selected from halogen radicals, monovalent hydrocarbon radicals of from 1 to 4 carbon atoms, and monovalent hydrocarbonoxy radicals of from 1 to 4 carbon atoms;
- n is an integer having a value of 0 or 1; and
- p and p' independently are integers having a value of 0 or 1.

These novel branched aromatic polycarbonates are characterized by intrinsic viscosities of about 0.3 to 2.0 dl/g as measured in methylene chloride at 25° C. These branched polycarbonates are substantially free of cross linking.

The thermoplastic, randomly branched polycarbonates of the present invention exhibit unique properties of non-Newtonian flow, melt elasticity and melt strength which permit them to be used in molding operations to obtain articles such as bottles which were not heretofore easily or readily produced with linear polycarbonates.

DETAILED DESCRIPTION OF THE INVENTION

The novel, thermoplastic, randomly branched polycarbonates of this invention are prepared from (1) the tri- and tetrafunctional aromatic hydroxy acids represented by Formula I

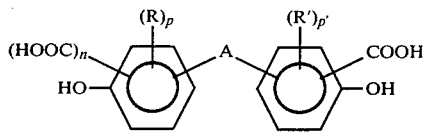  I where A, R, n and p are as defined above;

(2) from bisphenols, preferably represented by Formula II

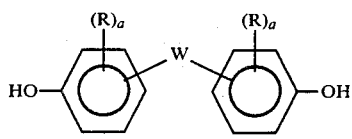  II where

R is as defined above;

a is independently selected from whole numbers having a value of from 0 to 4 inclusive;

W is selected from alkylene radicals, alkylidene radicals, cycloalkylene and cycloalkylidene radicals containing from 4 to 6 ring carbon atoms, and

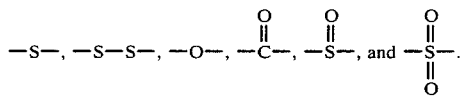

(3) a carbonate precursor.

The preferred halogen radicals represented by R in I and II are chlorine and bromine.

The monovalent hydrocarbon radicals represented by R are the alkyl radicals, the aryl radicals, the aralkyl radicals, the alkaryl radicals, and the cycloalkyl radicals. The preferred alkyl radicals represented by R are those containing from 1 to about 6 carbon atoms. Some illustrative non-limiting examples of these alkyl radicals include methyl, ethyl, propyl, isopropyl, butyl, isobutyl, tertiary butyl, pentyl, neopentyl, and the like. The preferred aryl radicals represented by R are those containing from 6 to 12 carbon atoms, i.e., phenyl, naphthyl and biphenyl. The preferred aralkyl radicals and alkaryl radicals represented by R are those containing from 7 to about 14 carbon atoms. Some illustrative non-limiting examples of these aralkyl and alkaryl radicals include benzyl, tolyl, ethylphenyl, and the like. The preferred cycloalkyl radicals represented by R are those containing from 4 to about 6 ring carbon atoms and include cyclobutyl, cyclopentyl, cyclohexyl, methylcyclohexyl, and the like.

The monovalent hydrocarbonoxy radicals represented by R are preferably selected from alkoxy radicals and aryloxy radicals. The preferred alkoxy radicals represented by R are those containing from 1 to about 6 carbon atoms. Some illustrative non-limiting examples of these alkoxy radicals include methoxy, butoxy, isopropoxy, propoxy, and the like. The preferred aryloxy radical is phenoxy.

Preferably R is independently selected from monovalent hydrocarbon radicals, with the alkyl radicals being the preferred monovalent hydrocarbon radicals.

The preferred alkylene radicals represented by W are those containing from 1 to about 6 carbon atoms. Some illustrative non-limiting examples of these alkylene radicals include methylene, ethylene, propylene, butylene, and the like. The preferred alkylidene radicals represented by W are those containing from 2 to about 6 carbon atoms. Some illustrative non-limiting examples of these alkylidene radicals include ethylidene, 1,1-propylidene, 2,2-propylidene, and the like.

The preferred dihydric phenols of Formula II are those wherein W is selected from alkylene or alkylidene radicals.

In the dihydric phenol of Formula II when more than one R substituent is present on the aromatic nuclear residue they may be the same or different.

The more preferred dihydric phenols of Formula II are the 4,4'-bisphenols.

The dihydric phenols of Formula II are well known in the art and are generally commercially available or may be readily prepared by known methods. These phenols are generally used in preparing conventional prior art polycarbonate resins.

The dihydric phenols that can be employed in the practice of this invention include bis(4-hydroxyphenyl)methane, 1,1-bis(4-hydroxyphenyl)ethane, 2,2-bis(4-hydroxyphenyl)propane, also called bisphenol-A or BPA, 2,2-bis(4-hydroxy-3-methylphenyl)propane, 3,3-bis(4-hydroxyphenyl)pentane, 2,2-bis(4-hydroxy-3-chlorophenyl)propane, 2,2-bis(4-hydroxy-3,5-dibromophenyl)propane, 2,2-bis(4-hydroxy-3,5-dimethylphenyl)propane, 1,1-bis(4-hydroxyphenyl)cyclohexane, p,p'-dihydroxydiphenyl, 3,3'-dichloro-4,4'-dihydroxydiphenyl, bis(4-hydroxyphenyl)ether, bis(4-hydroxyphenyl)sulfone, bis(3,5-dimethyl-4-hydroxyphenyl)sulfone, resorcinol, hydroquinone; 2,5-dichlorohydroquinone, 2-methylhydroquinone, bis(4-hydroxyphenyl)sulfoxide, bis(4-hydroxyphenyl)sulfide, bis(3,5-dimethyl-4-hydroxyphenyl)sulfoxide, and the like. A variety of additional dihydric phenols can also be employed such as are disclosed in U.S. Pat. Nos. 2,999,835; 3,028,365 and 3,153,008. It is, of course, possible to employ two or more different dihydric phenols or a copolymer of a dihydric phenol with glycol or with hydroxy or acid terminated polyester, or with one or more dibasic acids in the event a polycarbonate copolymer or copolyestercarbonate rather than a homopolymer is desired for use in the preparation of the branched polymers of this invention. The preferred dihydric phenol is bisphenol-A.

The tri- or tetrafunctional phenolic carboxylic acids represented by Formula I are commercially available or can be prepared by various condensation, insertion or substitution methods well known in the art.

Examples of the tri- or tetrafunctional hydroxy carboxylic acids of Formula I include:

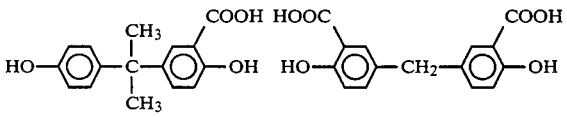

-continued

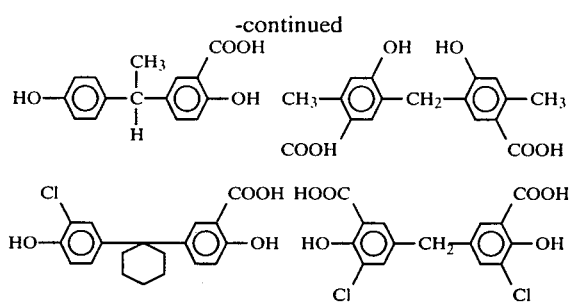

In preparing the novel thermoplastic, randomly branched polycarbonates of this invention, the amount of tri- or tetrafunctional compound which is reacted with the dihydric phenol and the carbonate precursor is critical in that the amount employed must be sufficient to produce a true thermoplastic, randomly branched polycarbonate which is substantially free of cross linking. If the amount of chain branching agent is less than 0.01 mole percent, based upon the moles of the dihydric phenol employed, the resulting polymer will not exhibit the degree of non-Newtonian melt characteristics desired for blow molding and/or melt extrusion purposes. Preferably, the compound of the present invention which is employed as the chain branching agent is present from about 0.01 to about 3.0, and more particularly from about 0.01 to about 1.0, mole percent of the phenolic compound, based on the total moles of dihydric phenol and based on its complete reaction on all functional sites.

The carbonate precursor employed can be either a carbonyl halide, a haloformate or a diaryl carbonate. Thus the carbonyl halides can be carbonyl chloride, carbonyl bromide, and mixtures thereof. The haloformates suitable for use include mono- or bishaloformates of dihydric phenols (bischloroformates of hydroquinone, monochloroformate of bisphenol-A, etc.). When using bishaloformates, equimolar amounts of free dihydric phenols are required to effect polymerization. When polymerizing monohaloformates of diphenols, no free diphenol is required. While other carbonate precursors will occur to those skilled in the art, carbonyl chloride, also known as phosgene, is preferred.

The polymerization of dihydric phenols to high molecular weight polycarbonates may be carried out by any conventional method known in the art. For example, phosgene can be introduced into a solution of the diphenol in organic bases, such as pyridine, triethylamine, dimethylaniline neatly or in the presence of suitable organic solvents, such as benzene, toluene, chlorobenzene, methylene chloride, carbon tetrachloride, and the like.

In the most widely practiced polymerization process, phosgene is introduced into an aqueous solution or slurry of the alkali metal salt of the diphenol in the presence of methylene chloride and a phase-transfer catalyst as well as a molecular weight regulator, usually a monofunctional phenol. One advantage of the present invention is that the phenolic branching agent has the same reactivity profile as the diphenol used to make the linear chains, hence it can be added, in the desired amount, not only later but together with the diphenol at the beginning of the polymerization process. In other words, the phenolic compounds can be formulated directly into the reaction mixture to be polymerized to branched polycarbonates.

The reaction between the halogen containing carbonate precursor, the dihydric phenol and the branching agent, when carried out by the interfacial method in accordance with this invention, is conducted in the presence of an inert organic solvent which is essentially immiscible with water and does not deleteriously affect the formed polymer. Examples of suitable organic solvents are methylene chloride, ethylene dichloride and chlorobenzene.

The alkali metal hydroxide which can be employed in the polymerization process can be any of the alkali metal hydroxides selected from the groups consisting of the alkali group and the alkaline earth groups. Specifically, these include potassium hydroxide, sodium hydroxide, lithium hydroxide, calcium hydroxide, magnesium hydroxide, and the like.

The interfacial, or phase transfer catalysts, which can be employed in the polymerization process can be any of the suitable catalysts that aid the polymerization of dihydric phenols with phosgene. Suitable catalysts include tertiary amines such as triethylamine, tripropylamine, N,N-dimethylaniline, and ammonium salts such as ethylammonium chloride, cetyl triethyl ammonium bromide, tetra-n-heptylammonium iodide, tetra-n-propyl ammonium chloride, tetramethylammonium chloride, tetramethylammonium hydroxide, tetra-n-butylammonium iodide, benzyltrimethylammonium chloride, and the like; and quaternary phosphonium compounds such as n-butyltriphenyl phosphonium bromide and tetrabutyl phosphonium chloride, and the like.

The molecular weight regulators which can be employed in the interfacial process include monohydric phenols such as phenol, chroman-I [4-(2,4,4-trimethylchromanyl)phenol], p-t-butylphenol, p-cumyl phenol, and the like. Preferably, phenol or p-tert-butyl-phenol is employed as the molecular weight regulator. An effective amount of a molecular weight regulator that will give modified melt flow value (KI) of 1,000 to 50,000 centiseconds, preferably from 5,000 to 30,000 centiseconds, may be used. Generally, it is preferred to use from 2-5 mol%, and more preferably from 2.5-4.5 mol% phenols such as phenol, chroman-I [4-(2,4,4-trimethylchromanyl)phenol], p-t-butyl phenol, p-cumyl phenol, and the like. Preferably, phenol or p-tert-butyl phenol is employed as the molecular weight regulator. An effective amount of a molecular weight regulator that will give a modified melt flow value (KI) of 1,000 to 50,000 centiseconds, preferably from 5,000 to 30,000 centiseconds may be used. Generally, it is preferred to use from 2-5 mol%, and more preferably from 2.5-4.5 mol%, of phenol as the molecular weight regulator.

It is sometimes desirable to introduce reducing agents, such as sodium dithionite, into the aqueous system in order to suppress the formation of colored contaminants.

The aqueous interfacial polymerization method may be carried out at temperatures from ambient to about 50° C. However, higher temperatures are within the scope of this invention since the instant method is not temperature-dependent.

The mixture of dihydric phenol and branching agent can also be converted into branched polycarbonates by transesterification with dialkyl, alkylaryl or diaryl carbonates at elevated temperatures from about 50° C. to about 325° C., at atmospheric or at reduced pressure, in neat form, or in the presence of neutral diluents or in the presence of transesterification catalysts, such as metal oxides, hydroxides, carbonates and the like, as known in the art. When using aryl carbonates, phenols are generated in the transesterification process, so that no molecular weight regulators need be added to the reaction mixture. In fact, the degree of polymerization is controlled by the extent of removal of the monohydroxylic coproducts, such as alcohols or phenols.

The branched polycarbonates, when produced according to the present invention by the interfacial polymerization technique, were recovered from the washed, neutral methylene chloride phase by precipitation with non-solvents, such as methanol, acetone or steam, followed by drying. The amorphous polymer was fed into an extruder operating at 265° C. and the extrudates were comminuted into pellets. When prepared by the transesterification method, the polycarbonate melt was directly converted into extrudate and pellets.

The following test procedures were utilized:

Intrinsic viscosity (I.V.) was determined in methylene chloride solution at 25° C. and is given as deciliters per gram (dl/g).

Modified melt flow (K.I.) values, expressed in centiseconds, were obtained by an automated ASTM-D-1238 procedure at 300° C. on a Tinius Olsen Melt Indexer, Model T-3, Condition 0.

Melt index ratio (M.I.R.), which is the ratio of melt flow rates at two different shear levels, and is a measure of the non-Newtonian property of the polymer, was obtained on the Tinius Olsen Melt Indexer described above. The M.I.R. values of linear Newtonian polycarbonates are typically less than 1.4, while those of the branched polycarbonates are typically 1.5 or higher.

The second order glass transition temperature is determined by using a Perkins-Elmer DSC-2B instrument, which measures the second order glass transition temperature (Tg) by differential scanning calorimetry.

The branched polycarbonates produced according to the present invention are soluble in selected organic solvents and can be worked into shaped articles from solutions, such as into films. Being thermoplastic, these branched polycarbonates can easily be fabricated by conventional shaping methods from melt, such as by extrusion molding, blow-molding, lamination, and the like.

The branched polycarbonates of the invention may be combined with other polycarbonates or with thermoplastic polyesters such as polyethyleneterephthalate or poly(1,4-butylene terephthalate). In addition, these branched polycarbonates may be combined with reinforcing fillers such as filamentous glass or with non-reinforcing fillers, mold release agents, impact modifiers, extrusion aids, light stabilizers, flame retardants, foaming agents, such as those disclosed in U.S. Pat. No. 4,263,409 and Ger. Offen. No. 3,400,086, which are incorporated by reference, and the like, if desired.

DESCRIPTION OF THE PREFERRED EMBODIMENTS

The following examples are set forth to illustrate the invention, and are not to be construed to limit the scope of the invention.

PREPARATION I

Preparation of 2,2'-dihydroxy-5,5-ethylenebisbenzoic acid

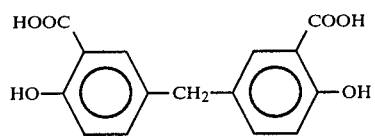

Into a warm solution of 34.6 g. (0.25 mole) of salicylic acid in 520 ml. of water, there was introduced hydrogen chloride gas, until saturation, followed by the addition of 0.75 g. of formaldehyde in form of 2.1 g. of an aqueous solution, while the reaction mixture was heated between 97° and 104° C. for 90 minutes. During this period crystals began to form, which were filtered off. Since the crystals contained some salicylic acid, they were purified by extraction of the starting material by hot water until pure. The progress of the reaction was followed by gas chromatography, in which salicylic acid emerged at 8.43 minutes relative to the 13.24 minutes' elution time of the p-cumylphenol reference. The pure title compound had a residence time of 22.67 minutes and a melting point of 254° to 256° C.

Gas chromatography indicated the formation also of the 2,2-dihydroxy-5,3'-methylenebisbenzoic acid isomer:

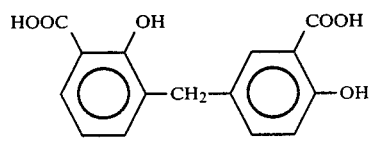

which had a retention time of 22.29 minutes.

PREPARATION 2

Preparation of 4,4'-dihydroxy-3,3'-methylenebisbenzoic acid

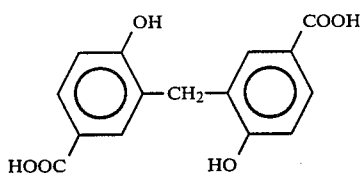

The procedure of Example 1 was exactly repeated, except that the salicylic acid was replaced with 34.6 g. (0.25 mole) of p-hydroxybenzoic acid. The filtered and purified crystals had a melting point of 297°–300° C. (decomposition) and a gas chromatography retention time of 22.97 minutes relative to the 13.26 minutes time of the p-cumylphenol reference.

PREPARATION 3

Preparation of isomeric 3,3'-dihydroxy-methylenebisbenzoic acids

Repeating the procedure of Example 1 by replacing the salicylic acid with equal amounts of m-hydroxybenzoic acid yielded crystal composed of three isomeric dihydroxy-methylenebisbenzoic acids with gas chromatography retention times of 21.06, 22.07 and 22.43 minutes relative to 13.04 minutes for the references p- cumylphenol. The mixture of the dihydroxymethylenebisbenzoic acids can be used directly for the preparation of branched polycarbonates, without the necessity of separating the reaction product into individual isomeric compounds.

This and the following examples illustrate the preparation of branched polycarbonates utilizing tri- and tetrafunctional phenolic carboxylic acids as branching components.

EXAMPLE 1

Preparation of a branched polycarbonate with 2,2'-dihydroxy-5,5'-methylene bisbenzoic acid To a well-stirred mixture of 57.1 g. (0.25 mole) of 2,2-bis(4-hydroxyphenol)propane (BPA), 0.75 g. (3.2 mole percent) of phenol, 0.7 ml. (2 mole percent) of triethylamine, 400 ml. of methylene chloride, and 300 ml. of water, there was added 0.25 g. (0.35 mole percent) of 2,2'-dihydroxy-5,5'-methylenebisbenzoic acid prepared as described in Example 1. The introduction of phosgene into the well-stirred reaction mixture was carried out at a rate of one gram per minute for five minutes at a pH maintained between 5 and 6 by the addition of 25% aqueous sodium hydroxide. Thereafter the pH was raised to 11 and additional phosgene was introduced at a rate of 1 gram per minute per 31 minutes, until the free BPA content of the aqueous phase was reduced below 25 parts per million.

The branched polycarbonate recovered from the washed, neutral methylene chloride phase by precipitation with methanol and drying had the following properties: intrinsic viscosity=0.563 dl/g; KI=9,510 csec; Tg=149.6; and M.I.R.=1.8.

EXAMPLE 2

Preparation of a branched polycarbonate with 4,4'-dihydroxy-3,3'-methylenebisbenzoic acid The procedure of Example 1 was repeated exactly, except that the tetrafunctional acid described in Example 1 was replaced with 0.25 g. (0.35 mole percent) of 4,4'-dihydroxy-3,3'-methylenebisbenzoic acid prepared as described in Preparation 3. The recovered branched polycarbonate had the following properties: intrinsic viscosity=0.599 dl/g and Tg=149.8° C.

EXAMPLE 3

Preparation of a branched polycarbonate with the commercially available 5-(dimethyl-p-hydroxybenzyl)salicylic acid Preparation of a branched polycarbonate with the commercially available 5-(dimethyl-p-hydroxybenzyl)-salicylic acid

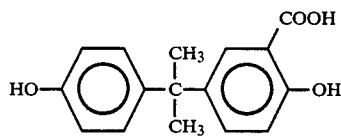

To a well-stirred mixture of 57.1 g. (0.25 mole) of 2,2-bis-(4-hydroxyphenyl)propane (BPA), 0.75 g. (3.2 mol%) of phenol, 0.7 ml. (2 mol%) of triethylamine, 400 ml. of methylene chloride, 300 ml. of water, 0.31 g. (0.45 mol%) of 5-(dimethyl-p-hydroxybenzyl)salicylic acid and enough 25% aqueous sodium hydroxide solution to maintain a pH of 5–6 while phosgenating at a rate of 1.0 g/minute for 5 minutes, and then to raise the pH to 11 while phosgenating at the same rate for 31 minutes, when the BPA content of the aqueous phase was reduced to below 5 parts per million. The methylene chloride phase was separated from the brine, washed with dilute (0.01N) aqueous hydrochloric acid and then twice with water, dried over silica gel, filtered, and the polymer was precipitated from the colorless solution with methanol. The white, air-dried (at 50° C.) polycarbonate was analyzed by the following test procedures, which yielded an I.V. of 0.572; glass transition temperature (Tg) of 153.6° C.; K.I. of 9.385; and M.I.R. of 1.5.

It is understood that various other modifications will be apparent to and can readily be made by those skilled in the art without departing from the scope and spirit of this invention. Accordingly, it is not intended that the scope of the claims appended hereto be limited to the description as set forth above, but rather that the claims be construed as encompassing all the features of patentable novelty which reside in the present invention, including all features which would be treated as equivalents thereof by those skilled in the art to which this invention pertains.

What is claimed is:

1. A high molecular weight, thermoplastic, randomly branched polycarbonate of an aromatic dihydric phenol, a carbonate precursor and a chain branching agent comprising at least one compound selected from the formula

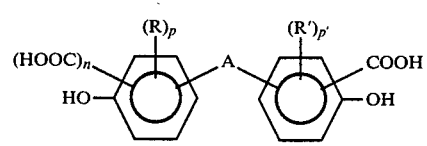

where

A is selected from alkylene radicals from 1 to 6 carbon atoms, alkylidene radicals from 1 to 6 carbon atoms, cycloalkylene radicals or cycloalkylidene radicals containing from 4 to 6 carbon atoms;

R and R' are independently selected from halogen radicals, monovalent hydrocarbon radicals of from 1 to 4 carbon atoms, or monovalent hydrocarbonoxy radicals of from 1 to 4 carbon atoms;

n is an integer having a value of 0 or 1;

p and p' independently are integers having a value of 0 or 1; and said randomly branched polycarbonate has an intrinsic viscosity of about 0.3 to about 2.0 dl/g in methylene chloride at 25° C.

2. The branched polycarbonate set forth in claim 1, wherein n is zero.

3. The branched polycarbonate set forth in claim 1, wherein n is one.

4. The branched polycarbonate set forth in claim 1, wherein p is zero.

5. The branched polycarbonate set forth in claim 1, wherein p' is zero.

6. The branched polycarbonate set forth in claim 1, wherein p is one.

7. The branched polycarbonate set forth in claim 1, wherein p' is one.

8. The branched polycarbonate set forth in claim 1, wherein A is alkylidene of 1 to 4 carbon atoms.

9. The branched polycarbonate set forth in claim 1, wherein A is ethylidene.

10. The branched polycarbonate set forth in claim 1, wherein A is methylene.

11. The branched polycarbonate set forth in claim 1, wherein A is cycloalkylidene of 4 to 6 carbon atoms.

12. The branched polycarbonate set forth in claim 1, wherein A is cycloalkylene of 4 to 6 carbon atoms.

13. The branched polycarbonate set forth in claim 1, wherein A is alkylene of 1 to 4 carbon atoms.

14. The branched polycarbonate set forth in claim 1, wherein A is ethylene.

15. The branched polycarbonate set forth in claim 1, wherein p and p' is zero.

16. The branched polycarbonate set forth in claim 1, wherein R is monovalent hydrocarbon of 1 to 4 carbon atoms.

17. The branched polycarbonate set forth in claim 1, wherein R' is monovalent hydrocarbon of 1 to 4 carbon atoms.

18. The branched polycarbonate set forth in claim 1, wherein R is monovalent hydrocarbonoxy of 1 to 4 carbon atoms.

19. The branched polycarbonate set forth in claim 1, wherein R' is monovalent hydrocarbonoxy of 1 to 4 carbon atoms.

20. The branched polycarbonate set forth in claim 1, wherein R is chloride or bromide.

21. The branched polycarbonate set forth in claim 1, wherein R' is chloro or bromo.

22. The branched polycarbonate set forth in claim 1, wherein the branching agent is 2,2'-dihydroxy-5,5'-methylene bisbenzoic acid.

23. The branched polycarbonate set forth in claim 1, wherein the branching agent is 2,2'-dihydroxy-5,5'-ethylidene bisbenzoic acid.

24. The branched polycarbonate set forth in claim 1, wherein the branching agent is 4,4'-dihydroxy-3,3'-methylene bisbenzoic acid.

25. The branched polycarbonate set forth in claim 1, wherein the branching agent is 3,3'-dihydroxy-4,4'-methylene bisbenzoic acid.

26. The branched polycarbonate set forth in claim 1, wherein the branching agent is 5-(dimethyl-p-hydroxybenzyl)salicylic acid.

* * * * *